(12) United States Patent
Torrecillas San Millan et al.

(10) Patent No.: US 8,546,285 B2
(45) Date of Patent: Oct. 1, 2013

(54) NANOSTRUCTURED COMPOSITE MATERIAL OF STABILIZED ZIRCONIA WITH CERIUM OXIDE AND DOPED ALUMINA WITH ZIRCONIA, USE, AND PROCEDURE FOR OBTAINING SAME

(75) Inventors: Ramón Torrecillas San Millan, Oviedo-Asturias (ES); Luis Antonio Díaz Rodríguez, Oviedo-Asturias (ES)

(73) Assignee: Consejo Superior De Investigaciones Cientificas (CSIC), Madrid (ES)

( * ) Notice: Subject to any disclaimer, the term of this patent is extended or adjusted under 35 U.S.C. 154(b) by 0 days.

(21) Appl. No.: 13/387,463

(22) PCT Filed: Jul. 23, 2010

(86) PCT No.: PCT/ES2010/070510
§ 371 (c)(1), (2), (4) Date: Jun. 8, 2012

(87) PCT Pub. No.: WO2011/015697
PCT Pub. Date: Feb. 10, 2011

(65) Prior Publication Data
US 2012/0238437 A1    Sep. 20, 2012

(30) Foreign Application Priority Data
Jul. 27, 2009    (ES) .................................. 200930516

(51) Int. Cl.
*C04B 35/488* (2006.01)
*C04B 35/119* (2006.01)
*B82Y 30/00* (2011.01)

(52) U.S. Cl.
USPC ............ 501/105; 977/776; 977/831; 264/6; 264/11; 264/667

(58) Field of Classification Search
USPC ............ 501/105; 264/6, 11, 667; 977/776, 977/831
See application file for complete search history.

(56) References Cited

U.S. PATENT DOCUMENTS

| 7,012,036 B2 | 3/2006 | Nawa et al. | |
| 7,182,929 B1* | 2/2007 | Singhal et al. | 423/592.1 |
| 7,928,028 B2* | 4/2011 | Nawa et al. | 501/105 |
| 8,093,168 B2* | 1/2012 | Nawa et al. | 501/105 |

OTHER PUBLICATIONS

Becher et al., Influence of $ZrO_2$ Grain Size and Content on the Transformation Response in the $Al_2O_3$-$ZrO_2$ (12 mol% $CeO_2$) System, *J. Am. Ceram. Soc.*, vol. 76, No. 3, 1993, pp. 657-663.

Benzaid et al., "Fracture toughness, strength and slow crack growth in a ceria stabilized zirconia-alumina nanocomposite for medical applications", *Biomaterials*, vol. 29, 2008, pp. 3636-3641.

(Continued)

*Primary Examiner* — Karl Group
(74) *Attorney, Agent, or Firm* — Merchant & Gould P.C.

(57) ABSTRACT

The present invention provides a nanostructured composite material of γ-alumina-doped zirconia stabilised with cerium oxide and zirconia-doped α-alumina, the process for obtaining it and the applications thereof, such as knee prostheses, hip prostheses, dental implants, mechanical components for pumps, alkaline batteries, ceramic components for stereotactic neurology, cutting tools, etc.

24 Claims, 3 Drawing Sheets

(56) References Cited

OTHER PUBLICATIONS

Chevalier et al., "Low-Temperature Aging of Y-TZP Ceramics", *J. Am. Ceram. Soc.*, vol. 82, No. 8, 1999, pp. 2150-2154.

Chevalier et al., "Nanostructured Ceramic Oxides with a Slow Crack Growth Resistance Close to Covalent Materials", *Nano Letters*, vol. 5, No. 7, 2005, pp. 1297-1301.

Christel et al., "Biomechanical Compatibility and Design of Ceramic Implants for Orthopedic Surgery", *Annals New York Academy of Sciences*, 1998, pp. 234-256.

Claussen, "Fracture Toughness of $Al_2O_3$ with an Unstabilized $ZrO_2$ Dispersed Phase", *Journal of the American Ceramic Society*, vol. 59, No. 1-2, 1976, pp. 49-51.

Claussen et al., "Effect of Induced Microcracking on the Fracture Toughness of Ceramics", *Ceramic Bulletin*, vol. 56, No. 6, 1977, pp. 559-562.

Fegley et al., "Preparation of Zirconia-Alumina Powders by Zirconium Alkoxide Hydrolysis", *Communications of the American Ceramic Society*, vol. 68, No. 2, 1985, pp. C-60-C-62.

Green et al., "Transformation toughening of ceramics", 1989, p. 32.

Guo et al. "On the degeneration of zirconia ceramics during low-temperature annealing in water or water vapor", *Journal of Physics and Chemistry of Solids*, vol. 60, 1999, pp. 539-546.

Heuer et al., "Stability of Tetragonal $ZrO_2$ Particles in Ceramic Matrices", *Journal of the American Ceramic Society*, vol. 65, No. 12, 1982, pp. 642-650.

Hori et al., "Strength-Toughness Relations in Sintered Isostatically Hot-Pressed $ZrO_2$-Toughened $Al_2O_3$", *J. Am. Ceram. Soc.*, vol. 69, No. 3, 1986, pp. 169-172.

International Search Report for International Application PCT/ES2010/0070510 mailed Dec. 3, 2010.

Jang et al., "Homogeneour Fabrication and Densification of $Al_2O_3$-$ZrO_2$ Composite Using a Colloid/Precursor Coating Route", *Ceramic Powder Science III*, 1990, pp. 979-986.

Kelly et al., "Stabilized zirconia as a structural ceramic: An overview", *Dental Materials*, vol. 24, 2008, pp. 289-298.

Lange, "Transformation toughening, Part 4, Fabrication, fracture toughness and strength of $Al_2O_3$-$ZrO_2$ composites", *Journal of Materials Science*, vol. 17, 1982, pp. 247-254.

Lange et al., "Degradation During Aging of Transformation-Toughened $ZrO_2$-$Y_2O_3$ Materials at 250° C", *J. Am. Ceram. Soc.*, vol. 69, No. 3, 1986, pp. 237-240.

Lawn, Brian. "Fracture of brittle solids, Second Edition." *New York: Cambridge University Press*, 1975.

Mitra et al., "Effect of $CeO_2$ on the sintering behavior of zirconia-alumina composite", *Ceramics International*, vol. 28, 2002, pp. 827-833.

Nawa et al., "Chapter 22: Ceramic based nanocomposites", *IOP Publishing Ltd*, 2004, 24 pages.

Sato et al., "Crystalline Phase Change in Yttria-Partially-Stabilized Zirconia by Low-Temperature Annealing", *Communications of the American Ceramic Society*, 1984, pp. C-212-C-213.

Sato et al., "Transformation of Yttria-Doped Tetragonal $ZrO_2$ Polycrystals by Annealing in Water", *J. Am. Ceram. Soc.*, vol. 68, No. 6, 1985, pp. 356-359.

Sato et al., "Transformation of yttria partially stabilized zirconia by low temperature annealing in air", *Journal of Materials Sceince*, vol. 20, 1985, 1466-1470.

Schehl et al., "Alumina nanocomposites from powder-alkoxide mixtures", Acta Materialia, vol. 50, 2002, pp. 1125-1139.

Szutkowska et al., "Crack growth resistance of $Al_2O_3$-$ZrO_{2(nano)}$ (12 mol% $CeO_2$) ceramics", *Journal of Achievements in Materials and Manufacturing Engineering*, vol. 22, Issue 1, 2007, pp. 41-44.

Tsukuma et al., Strength, fracture toughness and Vickers hardness of $CeO_2$-stabilized tetragonal $ZrO_2$ polycrystals (Ce-TZP), *Journal of Materials Science*, vol. 20, 1985, pp. 1178-1184.

Zahir et al., "Preparation and characterization of mesoporous ceria-zirconia-alumina nanocomposite with high hydrothermal stability", *J. Mater. Res.*, vol. 22, No. 11, 2007, pp. 3201-3209.

* cited by examiner

NANOSTRUCTURED COMPOSITE MATERIAL OF STABILIZED ZIRCONIA WITH CERIUM OXIDE AND DOPED ALUMINA WITH ZIRCONIA, USE, AND PROCEDURE FOR OBTAINING SAME

This application is a National Stage Application of PCT/ES2010/070510, filed Jul. 23, 2010, which claims benefit of Ser. No. P 200930516, filed Jul. 27, 2009 in Spain and which applications are incorporated herein by reference. To the extent appropriate, a claim of priority is made to each of the above disclosed applications.

The present invention relates to a process for obtaining a nanostructured composite material of zirconia and alumina with excellent mechanical properties that make it very suitable for applications such as knee prostheses, hip prostheses, dental implants, mechanical components for pumps, alkaline batteries, ceramic components for stereotactic neurology, cutting tools, etc.

PRIOR STATE OF THE ART

For a long time, ceramic materials have been used as artificial substitutes for all types of prostheses, primarily hip- and knee-type prostheses. One of the first advanced ceramics to be used as an orthopaedic implant was alumina [Christel, P. Meunier, A., Dorlot, J. M., Crolet, J. M., Witvoet, J., Sedei, L., et al., Ann. NY Acad. Sci., 523: 234-56, (1998)]. However, the high brittleness and the consequent failures of the prostheses made of this material contributed to the use of biomedical-grade zirconia. Practically until the year 2005, over 600,000 zirconia femoral heads had been implanted worldwide, primarily in the USA and Europe. Precisely, the improvement in the tenacity values of zirconia materials has been widely described in the literature as a phase-transformation toughening mechanism, involving the transformation of the metastable tetragonal phase of zirconia into the stable monoclinic phase at room temperature, with the consequent volumetric expansion entailed by said step, which causes significant compressive stresses. In an attempt to prevent this reversible transformation of the tetragonal phase (high temperature) into the monoclinic phase (room temperature), zirconia is usually doped with certain proportions of oxides such as CaO, MgO, $Y_2O_3$, $CeO_2$, which make it possible to retain the tetragonal structure at room temperature and, therefore, control the stress induced by the t→m transformation by hindering crack propagation, with the consequent increase in the tenacity of the material [Nelly, J. B., and Denry, I., Dental Materials, 24, 289-298, (2008)]. However, due to this metastable character of tetragonal zirconia, processes such as the machining of sintered parts, and even the polishing thereof, cause the spontaneous transformation into the monoclinic phase, with the consequent destabilisation of the ceramic piece. On the other hand, the propensity of stabilised zirconia to become degraded at room temperature in contact with body fluids, as well as water, is also very well documented [Sato, T., Ohtaki, S., Shimada, M., J. Mater. Sci., 20, 1466-1470, (1985)], [Sato, T., Shimada, M., J. Am. Ceram. Soc., 67, 212-213, (1984)], [Sato, T., Shimada, M., J. Am. Ceram. Soc., 68, 256-359, (1985)], [Lange, F. F., Dunlop, G. L., Davis, B. I., J. Am. Ceram. Soc., 69, 237-240, (1986)], [Chevalier, J., Calès, B., Drouin, J. M, J. Am. Ceram. Soc., 82, 2150-2154, (1999)], [Guo, X., J. Phys. Chem. Solids, 60, 539-546, (1999)]; for this reason, it is no longer used as a monolithic ceramic material for prostheses, given the expected catastrophic breakage that it presents. This phenomenon, known as ageing of zirconia, has multiple effects on the surface of sintered parts, with the appearance of grains and microcracks, a phenomenon that is intensified even further in oxide ceramic materials, due to the absorption of water that takes place at the vertex of the crack, which causes a significant reduction in the surface energy under humid conditions or in contact with the air atmosphere, facilitating the propagation thereof and, consequently, the delayed fracture of the material. Although this phenomenon was first discovered in glass, it is currently accepted for most ceramic materials [B. Lawn; Fracture of Brittle Solids, Cambridge University Press, (1993)].

In order to prevent the problems arising from the slow growth of cracks, it is possible to use ceramics with covalent bonds, such as silicon carbide or silicon nitride, which are practically insensitive to said phenomenon, but which require more costly processing methods, primarily due to the higher temperature whereat they must be sintered, using controlled-atmosphere kilns.

On the other hand, the transformation reinforcement mechanism of zirconia has been particularly applied to the improvement of the mechanical behaviour of alumina, which, albeit having a high hardness level, a high chemical stability and a high corrosion resistance, for which reasons it is one of the most widely used ceramic materials in industry, particularly in the field of refractory materials, has a low fracture tenacity ($K_{10}$) that makes it an unreliable material by itself in structural or structural-type biomedical applications. Thus, for example, zirconia-doped alumina composites have been widely studied [D. J. Green, R. H. J. Hannink, M. W. Swain, Transformation toughening of ceramics; (1989) p. 232], [N. Claussen, J. Am. Ceram. Soc.; 59 [1-2], 49-51, (1976)], [N. Claussen, J. Steeb and R. F. Pabst, Am. Ceram. Soc. Bull.; 56 [6], 559-562, (1977)], [F. F. Lange, J. Mater. Sci.; 17, (1982) 247-254], [S. Hori, M. Yoshimura, S. Somiya, J. Am. Ceram. Soc.; 69, 169, (1986)], [P. F. Becher, K. B. Alexander, A. Bleier, S. B. Waters, W. H. Warwick, J. Am. Ceram. Soc.; 76, 657, (1993)], in order to improve this structural behaviour of monolithic alumina.

The addition of tetragonal zirconia as a second phase in alumina materials causes an increase in the resistance to bending and fatigue, and in the fracture tenacity, as compared to those produced with monolithic alumina. In the processing of these composite materials, zirconia stabilised with yttrium oxide, titanium oxide or cerium oxide is generally used, such that the zirconia does not undergo the tetragonal-monoclinic phase change during cooling of the sintered material. The reinforcement mechanism of these materials, called ZTA (Zirconia-Toughened-Alumina), acts when the crack reaches the region where the zirconia particles are located, promoting the absorption of energy by the zirconia crystals and a change in the crystalline structure thereof, from the tetragonal to the monoclinic phase. This change in structure causes an increase in the volume, which generates compressive stresses in the alumina matrix that contribute to closure of the crack, thereby creating an energy barrier against any subsequent growth thereof.

ZTA composite materials may be obtained by various pathways. Conventional processes include the mechanical mixing of powders and/or grinding, using an attrition mill or the hydrolysis de zirconium alkoxides in a dispersed suspension of alumina [B. J. Fegley, P. White, H. K. Bowen, J. Am. Ceram. Soc.; 68 [2]: C 60-62, (1985)], [G. I. Messing, S. I. Hirano, H. Hausner, Ceramic Powder Science III; 979, (1990)]. However, these processes do not make it possible to achieve a microstructure with homogeneously-distributed fine-size grains.

In order to resolve the limitations of prior methods, the scientific literature refers to a colloidal pathway for the synthesis of alumina-zirconia nanocomposites, characterised in that it does not use stabilisers for zirconia and a final homogeneous distribution of the zirconia nanophase is obtained in both the grain edges and inside the alumina crystals [M. Schehl, L. A. Díaz and R. Torrecillas, Acta Materialia; 50, [5], 1125-1139, (2002)]. As mentioned in said processing pathway, the use of stabilisers is avoided, since the zirconia sizes obtained are practically equal to and smaller than the critical size for the spontaneous transformation into monoclinic zirconia [Heder, A. H., Claussen, N., Priven, W. M., Rule, M., J. Am. Ceram. Soc., 65, 642-650, (1982)]. On the other hand, the final homogeneoous distribution of the zirconia nanoparticles significantly affects the evolution of the microstructure during sintering and, consequently, the properties of the dense material.

Following said pathway [M. Schehl, L. A. Díaz and R. Torrecillas, Acta Materialia; 50, [5], 1125-1139, (2002)], significant increases in the fracture tenacity ($K_{10}$) may be achieved with respect to the values of monolithic alumina, even reaching 6.5 $MPa.m^{1/2}$. Although the high value of $K_{IC}$ is relevant, the most important aspect of this new pathway is the increase in the stress intensity factor threshold below which there is no risk of crack propagation, $K_{I0}$, such that the $K_{IC}$ and $K_{I0}$ values in the resulting materials are very close [J. Chevalier, S. Deville, G. Fantozzi, J. F. Bartolomé, C. Pecharromán, J. S. Moya, L. A. Díaz, and R. Torrecillas, 5-7, 1297-1301, (2005)].

Other authors have also proposed an improvement in the tenacity of alumina composites, using the second phase of zirconia stabilised with cerium oxide (Ce-TZP). As expected, the use of Ce-TZP in these materials causes the fracture tenacity to be quite higher than that presented by alumina-zirconia nanocomposites. Thus, by controlling the content of cerium oxide, the microstructure of the material and the percentage of transformed monoclinic zirconia [K. Tsukuma, M. Shimada, J. Mater. Sci., 20, 1178-84, (1985)], fracture tenacity values greater than 16 $MPa.m^{1/2}$ may be achieved using molar proportions of cerium oxide ranging between 10%-12%.

Following this idea, some authors [M. Nawa, K. Yamaguchi, M. Toki, U.S. Pat. No. 7,012,036, of 14 Mar. 2006] have disclosed a process for obtaining composite materials of alumina and Ce-TZP which they call a dual nanostructure. The microstructure of this material is characterised by the existence of a first group of grains of zirconia stabilised with cerium oxide, wherein alumina crystals are dispersed as a second phase and these crystals, in turn, contain smaller stabilised zirconia crystals. The processing of this nanocomposite is performed by the traditional method of powder mixing, in this case using nanometric-type powders. It could be said that this is a nanocomposite with an interpenetrated-type nanostructure [M. Nawa and K. Niihara, Ceramic based nanocomposites. In: "Metal and Ceramic Matrix Composites", Edited by B. Cantor, F. Dunne and I. Stone, IOP Publishing Ltd., chapter 22, (2004)]. The mechanical properties and the slow growth of cracks have been measured in these nanocomposites [R. Benzaid, J. Chevalier, M. Saadaoui, G. Fantozzi, M. Nawa, L. A. Díaz, R. Torrecillas, Biomaterials, 3636-3641, (2008)], to obtain $K_{I0}$ values of approximately 4.5 $MPa.m^{1/2}$ and $K_{IC}$ values of 8.8 $MPa.m^{1/2}$, which are above the biomedical standards for prostheses of the monolithic alumina and zirconia types.

The proposed invention provides a new obtainment process that improves the low reliability of the currently-known alumina-zirconia-cerium oxide materials. This nanocomposite, which simultaneously presents $K_{IC}$ and $K_{I0}$ values greater than 9 and 4.5 $MPa.m^{1/2}$, respectively, is obtained by the dual doping of two types of nanoparticles: zirconia stabilised with cerium oxide on the one hand and alumina on the other hand. The subsequent mixing of both groups of doped nanoparticles produces, by means of sintering, a material with a stress intensity factor threshold, $K_{I0}$, that is much higher than that exhibited by the alumina-zirconia materials known thus far.

DESCRIPTION OF THE INVENTION

The present invention provides a nanostructured composite material of γ-alumina-doped zirconia stabilised with cerium oxide and zirconia-doped α-alumina, the process for obtaining it and the applications thereof.

A first aspect of the present invention relates to a nanostructured composite material (hereinafter material of the invention) that comprises:
a) $ZrO_2$ stabilised with $CeO_2$, with a mean particle size ranging between 50 and 1000 nm, doped with γ-$Al_2O_3$, with a concentration of γ-$Al_2O_3$ ranging between 5% and 50% by volume with respect to the total of (a) and mean sizes of less than 50 nm.
b) α-$Al_2O_3$, with a mean particle size ranging between 150 and 400 nm, doped with $ZrO_2$ nanoparticles, with a mean particle size of ≤40 nm and a concentration of $ZrO_2$ ranging between 0.5% and 5% by weight with respect to the total of (b), located at the edges of the α-$Al_2O_3$ grains.

In the present invention, composite materials are understood to mean those that fulfil the following properties:
They are made up of 2 or more components that at first glance are physically indistinguishable and may not be mechanically separated.
They present several phases that are mineralogically different, completely insoluble and separated by an interphase.
Their mechanical properties are greater than the simple sum of the properties of their components (synergy).

The term "nanostructured" refers to a structure with an intermediate size between molecular and microscopic structures (nano-micrometric size). The nanoparticles may have a size ranging between 0.1 and 100 nm in each spatial dimension.

In a preferred embodiment of the material of the invention, the molar concentration of $CeO_2$ ranges between 10% and 12% with respect to the total $ZrO_2$ stabilised with $CeO_2$ in (a) and the concentration of γ-$Al_2O_3$ is 20% by volume with respect to the total of (a).

In another preferred embodiment of the material of the invention, the concentration of $ZrO_2$ is 2.5% by weight with respect to the total of (b).

And, in another preferred embodiment of the material of the invention, the concentration of (a) ranges between 60% and 80% by volume with respect to the total material.

A second aspect of the present invention relates to a process for obtaining the material of the invention (hereinafter process of the invention), which comprises the following steps:
a) mixing of a suspension of $ZrO_2$ powder stabilised with $CeO_2$, with a solution of an aluminium salt,
b) drying of the suspension obtained in step (a),
c) sieving of the dry powder obtained in step (b),
d) thermal treatment of the sieved powder obtained in step (c),
e) mixing of a suspension of α-$Al_2O_3$ powder with a solution of a zirconium alkoxide or a zirconium salt,
f) drying of the suspension obtained in step (e), g) sieving of the dry powder obtained in step (f),
h) thermal treatment of the sieved powder obtained in step (g),
i) mixing and suspension of the powders obtained in steps (d) and (h),
j) drying of the suspension obtained in step (i),
k) sieving of the dry powder obtained in step (j),
l) shaping of the sieved powder obtained in step (k), and
m) sintering of the shaped powder obtained in step (l).

The inventors have developed a process for obtaining complex nanostructured composite materials made of three zirconiα-alumina-cerium oxide phases, using a colloidal methodology to superficially modify the ceramic nanopowders used, by means of various precursors, primarily alkoxides. This processing pathway is based on the fact that there are hydroxyl groups ($OH^-$) with a strong nucleophilic character on the surface of the nanopowders, which react with the metal alkoxides added. Thus, in the presence of a metal alkoxide, the free electron pairs of the oxygen in the nanopowders attack the metal, which has an electrophilic character, thereby displacing one of the alkoxide groups, since they have less of a nucleophilic character. From this time on, the water physisorbed on the nanoparticles acts as a catalyst and continues the process on the rest of the alkoxide groups. By controlling the processing variables, this process makes it possible to obtain homogeneous distributions of 2-to-20-nm nanoparticles on the surfaces of the zirconia and alumina nanoparticles. Once obtained, the nanocomposite or superficially-modified powders are processed in a conventional manner by traditional powder mixing.

The process for obtaining the nanostructured zirconiα-alumina-cerium oxide powders of the present invention is performed from the following starting materials:

Zirconia powder stabilised with cerium oxide (TZP-Ce), with a total molar concentration of cerium oxide ranging between 10% and 12% and a mean particle size ranging between 0.05 and 1 μm.

Aluminium chloride or aluminium alkoxide.

High-purity alumina powder, with a mean particle size ranging between 0.1 and 1 μm.

Zirconium alkoxide.

Absolute ethanol, as a solvent medium.

The process for obtaining the material of the invention is performed by two doping pathways:

In a first pathway, the TZP-Ce powder is coated with γ-alumina nanoparticles, using aluminium chloride or any aluminium alkoxide, and, subsequently, it is subjected to a thermal treatment in order to activate the formation of said transition alumina. This coating is performed by two types of reactions: i) initially, the aluminium chloride is introduced into a solvent medium, to obtain an aluminium ethoxychloride that is subsequently added to the corresponding suspension of TZP-Ce powders, and ii) the $OH^-$ groups that coat these TZP-Ce powders react with the metallic part of the aluminium alkoxide added, resulting in the coating of said zirconia nanoparticles. Reaction i) may also be performed directly from a commercial aluminium alkoxide, without going through the formation through an aluminium salt.

In a preferred embodiment of the process of the invention, in step (a) a suspension of $ZrO_2$ powder stabilised with $CeO_2$ is mixed in a solvent medium, preferably an alcohol solution, and, more preferably, a solution of absolute ethanol, at a concentration ranging between 60%-75% by weight, with a solution of an aluminium salt, preferably $AlCl_3$, or an aluminium alkoxide, diluted in a solvent medium, preferably an alcohol solution, and, more preferably, a solution of absolute ethanol, at a concentration ranging between 95%-97% by weight, and the mixture is kept under stirring, preferably magnetic or mechanical stirring.

In order to perform the doping with γ-alumina of the $ZrO_2$ stabilised with $CeO_2$, the mixing in step (a) is performed by adding, preferably drop by drop, the solution of aluminium ethoxychloride, obtained from $AlCl_3$, or the solution of aluminium alkoxide, to the suspension of the TZP-Ce powder, in the adequate proportions.

In another preferred embodiment of the process of the invention, the drying of step (b) is performed in two steps: first at a temperature ≤70° C., under stirring, preferably magnetic or mechanical stirring, and, secondly, at a temperature ranging between 110° C.-120° C. for a period of time of at least 24 hours.

In another preferred embodiment of the process of the invention, the sieving of step (c) is performed at a mesh aperture ≤63 μm, preferably using a nylon mesh.

In another preferred embodiment of said process, the thermal treatment of step (d) is performed by heating, preferably in a laboratory electric kiln, with a slope ranging between 5 and 10° C./min, to a final temperature ranging between 800° C. and 1100° C., which is maintained for a period of time of between 1 and 3 h, in order to favour the formation of γ-alumina on the TZP-Ce nanoparticles. Using solid-state nuclear magnetic resonance (NMR), it has been verified that the type of transition alumina that is formed on the nanopowders with the thermal treatment at this temperature is precisely a γ-alumina.

In a second pathway, the alumina powder (α type) is also coated with zirconia nanoparticles using a zirconium alkoxide. To this end, the alumina powder is suspended in a solvent medium under stirring. The corresponding quantity of zirconium alkoxide to shape the desired composition is added to said suspension, in the adequate proportion. In this case, there is also a substitution reaction of the $OH^-$ groups in the alumina grains and the metallic cations pertaining to the alkoxide (zirconium in this case), to produce a surface coating of said alumina nanopowders.

Therefore, in a preferred embodiment of the process of the invention, in step (e) a suspension of $\alpha$-$Al_2O_3$ powder is mixed, in a solvent medium, preferably an alcohol solution, and, more preferably, a solution of absolute ethanol with a purity greater than 99.97%, at a concentration ranging between 60%-75% by weight, with a solution of a zirconium salt, preferably a zirconium alkoxide, and, more preferably, zirconium isopropoxide, diluted in a solvent medium, preferably an alcohol solution, and, more preferably, a solution of absolute ethanol, at a concentration ranging between 50%-55% by weight.

In order to perform the doping of α-alumina with zirconia, the mixture of step (e) is made by adding, preferably drop by drop, the solution of zirconium alkoxide to the suspension of the $\alpha$-$Al_2O_3$ powder, in the adequate proportions.

In another preferred embodiment of the process, the drying of step (f) is performed in two steps: first, at a temperature ≤70° C. under stirring, preferably magnetic or mechanical stirring, and, secondly, at a temperature ranging between 110° C.-120° C. for a period of time of at least 24 h.

In another preferred embodiment of the process, the sieving of step (g) is performed at a mesh aperture ≤63 μm, preferably using a nylon mesh.

In another preferred embodiment of the process, the thermal treatment of step (h) is performed by heating, with a slope ranging between 5 and 10° C./min, to a final temperature ranging between 850° C.-1000° C., which is maintained for a period of time of between 1-3 h, in order to achieve crystallisation of the zirconia nanoparticles on the alumina nanocrystals (nanostructured powders).

The nanostructured powders obtained by the two preceding pathways are analysed independently, in order to determine the true density thereof by means of helium pycnometry and, thus, perform the pertinent mixtures of all the compositions by volume.

In a preferred embodiment of the process of the invention, in step (i), the powders obtained in steps (d) and (h) are mixed, in the adequate proportions, and suspended in a solvent medium, preferably an alcohol solution, and, more preferably, an isopropanol solution, and subjected to homogenisation for a period of time of at least 72 h.

The mixing in step (i) is performed in an industrial dispersion medium, preferably a polypropylene jar, with zirconia-yttrium oxide balls with a diameter ranging between 2-5 mm, and is maintained in a mill, preferably a roller mill, for a period of time of between 48 and 78 h, in order to achieve a perfect homogenisation of the required compositions.

In another preferred embodiment of the process of the invention, the drying of step (j) is performed at a temperature ≤70° C.

In another preferred embodiment of the process of the invention, step (I) is performed by cold isostatic pressing or any other ceramic shaping means selected from the list that comprises casting, pressure casting and tape casting.

FIG. (1) and FIG. (2) show the microstructure of the final morphology obtained following the thermal treatment of said powders at 900° C. and 850° C., for both the formation of the γ-alumina on the zirconia and of the zirconia on the alumina, respectively.

In another preferred embodiment of the process, the sintering of step (m) is performed at a temperature ranging between 1450° C. and 1500° C.

Moreover, a last aspect of the present invention relates to the use of the material of the invention for the manufacturing of a product selected from the list that comprises knee prostheses, hip prostheses, mechanical components for pumps, dental implants, alkaline batteries, ceramic components for stereotactic neurology and cutting tools.

Throughout the description and the claims, the word "comprises" and the variants thereof are not intended to exclude other technical characteristics, additives, components or steps. For persons skilled in the art, other objects, advantages and characteristics of the invention will arise partly from the description and partly from the practise of the invention. The following examples and drawings are provided for illustrative purposes, and are not intended to limit the scope of the present invention.

EXAMPLES

Figure 1:
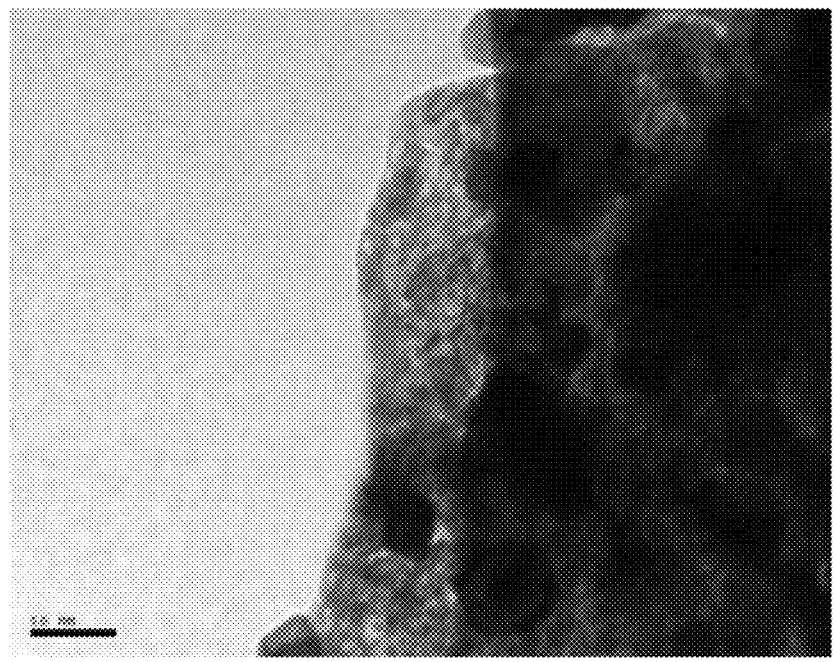
FIG. 1.—Microphotography, by means of transmission electron microscopy (TEM), of zirconia crystals (dark shades) imbibed in a transition alumina phase (γ-alumina) (clearer shades).
Figure 2:
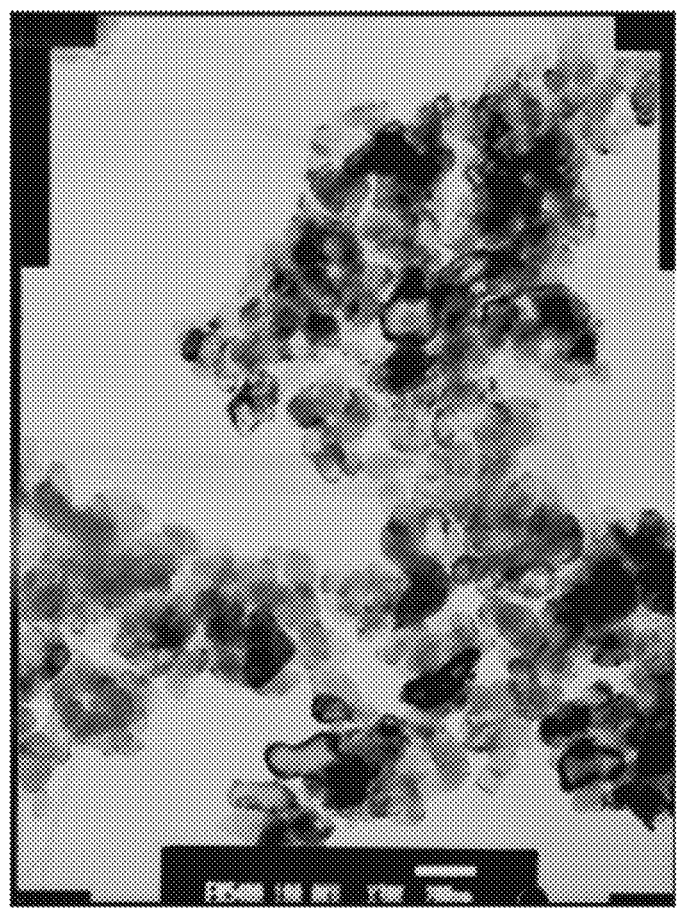
FIG. 2.—Morphological appearance of the alumina crystals coated with zirconia, observed by TEM.

The following examples are offered as additional guidance for the average person skilled in the art, and in no case should be considered to limit the scope of the invention.

In order to achieve a better understanding of the object and functionality of this patent, and without them being understood to be restrictive solutions, two examples of compositions will be disclosed:

Example 1

The following composition was made:
Composition A80%/B20% (% by volume) of the following mixtures:
  a) A=($ZrO_2$12% mol$CeO_2$)+20% vol.γ-alumina
  b) B=Alumina+2.5% (weight) $ZrO_2$
The starting raw materials involved are:
Alumina:
  a) Taimei (TM-DAR) (γ-$Al_2O_3$)
Zirconia:
  a) Daiichi (TZP-12% molar $CeO_2$)
Zr isopropoxide (Sigma-Aldrich) ($C_{12}H_{28}O_4Zr$)
Aluminium chloride ($AlCl_3$, 99.9% purity) (Sigma-Aldrich)

In the first place, the pulverulent raw materials are characterised: alumina and zirconia. To this end, a helium pycnometer is used to determine the true densities of said powders. Prior to the measurement, they must be kept at 120° C. in a laboratory stove until a constant weight of the product to be analysed is achieved. In our case, the densities obtained were the following:

TABLE 1

|  | Taimei TM-DAR Alumina | Daiichi Zirconia |
| --- | --- | --- |
| True density (g/cm$^3$) | 3.9315 | 6.2673 |

In order to obtain composition A, we start with 100 g of zirconia. Taking into consideration its density (6.2673 g/cm$^3$), the volume is 15.956 cm$^3$. Since we intend to dope these zirconia grains with 20% of γ-alumina (ρ=3.65 g/cm$^3$), this percentage represents 3.989 cm$^3$ of γ-alumina. Converted into weight, this would be 14.56 g of γ-alumina. Therefore, we would have to weigh a quantity of 38.079 g of $AlCl_3$, taking into consideration the molecular weights of both γ-alumina (101.96 mol) and $AlCl_3$ (266.66 mol). Subsequently, the 38.079 g of $AlCl_3$ were placed under a hood with the capacity to extract acid gases, in absolute ethanol (1,100 ml), under magnetic stirring with a teflon-coated magnet in order to produce complete dissolving of the powder added. Precautions must be taken when adding the aluminium chloride powder on the absolute ethanol, given the strong exothermal reaction that takes place, with the consequent emission of acidic chlorine fumes. Once the powder has been completely dissolved in the alcohol, we begin to add this solution drop by drop on the suspension of 100 g of zirconia that is previously being dispersed, also under magnetic stirring, in another precipitation flask. When the aluminium ethoxychloride has been incorporated drop-by-drop into the zirconia suspension, and always under magnetic stirring, the suspension is dried at less than 70° C. When the material is practically dry, it is introduced into a laboratory stove at 70° C. for 24 h, attempting to manually disintegrate the lumps produced, and, once this time has elapsed, said powder is dried for an additional 24 h at 120° C. When the latter is completely dry, the agglomerates are destroyed and the zirconia balls are grinded in a planetary-type ball mill until the material is sieved below the mesh aperture of less than 63 μm. Under these conditions, the material is ready to be introduced into a laboratory kiln at a temperature of 900° C. for 2 h (rising slope of 10° C./min), in order to favour crystallisation of the γ-alumina nanoparticles on the zirconia grains. Once the thermal activation of these powders is complete, the true density thereof is calculated by means of helium pycnometry. The result obtained is the following: 5.6936 g/cm$^3$. This is the true density value obtained for composition A.

As regards the obtainment of composition B, a process very similar to the above is followed. In this case, we also start from 100 g, and 2.5% by weight of zirconia (ZrO$_2$), from zirconium alkoxide, is added. This zirconium isopropoxide is diluted in a 70% by weight ethanol solution, and this must be taken into consideration when making the final calculations.

The molecular weights of ZrO$_2$ and Zr(C$_3$H$_7$O)$_4$ are 123.22 and 327.57 mol/g, respectively; therefore, the weight percentage of ZrO$_2$ with respect to the alkoxide will be 37.6%. Since the alkoxide is diluted to 70% by weight, we will multiply that percentage by 0.7, to obtain 26.33%. Taking into consideration the weight percentages of alumina (97.5%) and zirconia (2.5%), for the 100 g of alumina we would need to weigh 2.564 g of zirconia and, considering the 70% dilution of the alkoxide, we would have to weigh 9.738 g of Zr isopropoxide in order to obtain the selected composition. This alkoxide weight is diluted to 50% by weight in absolute ethanol and, subsequently, it is added drop by drop on the alumina suspension that is being stirred, in order to obtain a good homogenisation. The entire process described thus far must be performed in a glove chamber under a N$_2$ atmosphere, so as to prevent hydrolysis of the corresponding alkoxide. The suspension is subsequently dried at <70° C. under magnetic stirring and, finally, it is introduced into a laboratory stove at 120° C. for the complete drying thereof. The dry, somewhat agglomerated powder is sieved below 63 μm, such that it is ready to be introduced into a laboratory kiln, to reach a final temperature of 850° C./2 h, with a rising slope of 10° C./min. With this process, we would already have the required composition B. The true density value, determined by helium pycnometry, of this composition B is 3.9975 g/cm$^3$.

The following step is mixing the corresponding volume proportions (80/20) of both compositions, called A and B. To this end, an adequate polypropylene jar is used and the mixture is accompanied by a quantity of zirconia-yttrium oxide balls (3 mm in diameter) by weight of about five times the weight thereof and with the sufficient quantity of isopropyl alcohol (2-propanol) as the liquid homogenising medium. The immersion time in the corresponding roller mill must be at least about 72 h. Thereafter, the material is ready to be dried and, finally, sieved below 63 μm, prior to being introduced into an isostatic press in order to green-shape the corresponding ceramic pieces. Following the corresponding study of the related variables in this regard, it will also be possible to spray these powders for a better handling thereof, as well as a better sintering of the final pieces.

Figure 3:
FIG. 3.—Ball of the nanostructured ceramic material, cold-isostatically pressed and sintered at 1475° C./1 h.

Precisely, the shaping of pieces by means of isostatic pressing at 200 MPa and the subsequent treatment thereof at 1475° C./1 h results in materials such as that presented in FIG. 3).

Figure 4:
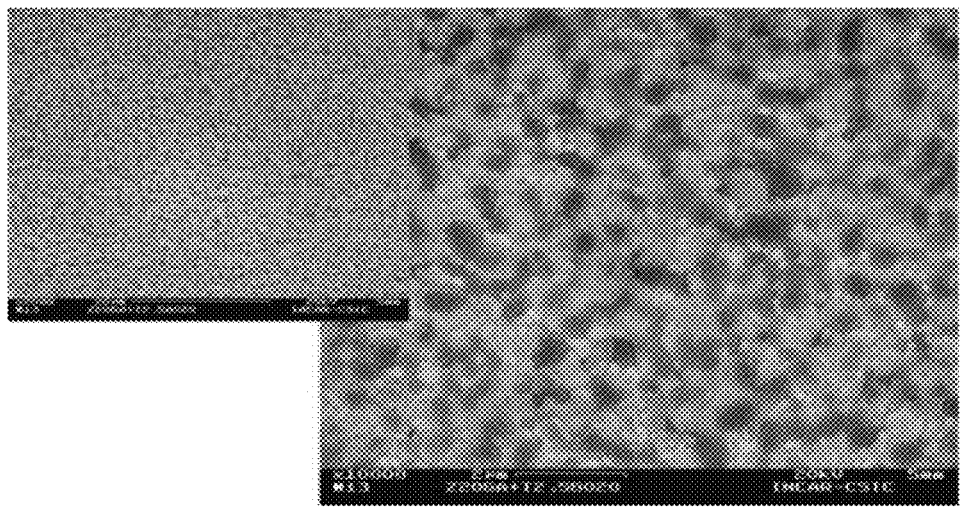
FIG. 4.—Microstructures, obtained by means of scanning electron microscopy, of the composition A80% vol./B20% vol., where A=($ZrO_2$12% mol$CeO_2$)+20% vol.γ-alumina and B=Alumina+2.5% (weight) $ZrO_2$, thermally treated at 1475° C./1 h.

The microstructures of the same material may be observed in FIG. 4).

The mechanical behaviour of two 6×4×40 mm test-tubes was analysed in a universal assay equipment from the INSTRON firm (model 8562), using the four-point bending method; the results of the two compositions obtained are presented in Table 2.

TABLE 2

| | Bending resistance $\sigma_f$/MPa | Tenacity $K_{ic}$ MPa·m$^{1/2}$ | Tenacity $K_{i0}$ MPa·m$^{1/2}$ |
|---|---|---|---|
| Z12Ce + 20%γA + Tai2.5Z (80/20) | 711.89 | 10.09 | 5.95 |

Example 2

The second composition selected was:
Composition A60%/B40% (% by volume) of the following mixtures:
a) A=(ZrO$_2$12% molCeO$_2$)+20% vol.γ-alumina
b) B=Alumina+2.5% (weight) ZrO$_2$ The starting raw materials involved are:
Alumina:
a) Taimei (TM-DAR) (γ-Al$_2$O$_3$)
Zirconia:
a) Daiichi (TZP-12% molar CeO$_2$)
Zr isopropoxide (Sigma-Aldrich) (C$_{12}$H$_{28}$O$_4$Zr)
Aluminium chloride (AlCl$_3$, 99.9% purity) (Sigma-Aldrich)

The embodiment of the second composition (60/40) is completely equivalent, in its development, to that described in the first example, except as regards the final respective concentrations.

The mechanical behaviour of two 6×4×40 mm test-tubes was analysed in a universal assay equipment from the INSTRON firm (model 8562), using the four-point bending method; the results of the two compositions obtained are presented in Table 3.

TABLE 3

| | Bending resistance $\sigma_f$/MPa | Tenacity $K_{ic}$ MPa·m$^{1/2}$ | Tenacity $K_{i0}$ MPa·m$^{1/2}$ |
|---|---|---|---|
| Z12Ce + 20%γA + Tai2.5Z (60/40) | 634.13 | 9.31 | 5.1 |

The invention claimed is:

1. A nanostructured composite material that comprises:
a) ZrO$_2$ stabilised with CeO$_2$, with a mean particle size ranging between 50 and 1000 nm, doped with γ-Al$_2$O$_3$, with a concentration of γ-Al$_2$O$_3$ ranging between 5% and 50% by volume with respect to the total of (a) and mean sizes of less than 50 nm,
b) α-Al$_2$O$_3$, with a mean particle size ranging between 150 and 400 nm, doped with ZrO$_2$, with a mean particle size ≤40 nm and a concentration of ZrO$_2$ ranging between 0.5% and 5% by weight with respect to the total of (b).

2. The material according to claim 1, wherein the concentration of γ-Al$_2$O$_3$ is 20% by volume with respect to the total of (a) and the concentration of ZrO$_2$ is 2.5% by weight with respect to the total of (b).

3. The material according to claim 1, wherein the molar concentration of CeO$_2$ ranges between 10% and 12% with respect to the total ZrO$_2$ stabilised with CeO$_2$.

4. The material according to claim 1, wherein the concentration of (a) ranges between 60% and 80% by volume with respect to the total material.

5. A process for preparing the material according to claim 4, which comprises the following steps:
a) mixing of a suspension of ZrO$_2$ powder stabilised with CeO$_2$ with a solution of an aluminium salt or an aluminium alkoxide, b) drying of the suspension obtained in step (a),
c) sieving of the dry powder obtained in step (b),
d) thermal treatment of the sieved powder obtained in step (c),
e) mixing of a suspension of $\alpha$-$Al_2O_3$ powder with a solution of a zirconium salt or an aluminium alkoxide,
f) drying of the suspension obtained in step (e),
g) sieving of the dry powder obtained in step (f),
h) thermal treatment of the sieved powder obtained in step (g),
i) mixing and suspension of the powders obtained in steps (d) and (h),
j) drying of the suspension obtained in step (i),
k) sieving of the dry powder obtained in step (j),
l) shaping of the sieved powder obtained in step (k), and
m) sintering of the shaped powder obtained in step (l).

6. The process according to claim 5, wherein, in step (a), a suspension of $ZrO_2$ powder stabilised with $CeO_2$, in an alcohol at a concentration ranging between 60%-75% by weight, is mixed with a solution of an aluminium salt diluted in an alcohol at a concentration ranging between 95%-97% by weight.

7. The process according to claim 6, wherein the alcohol is absolute ethanol.

8. The process according to claim 5, wherein, in step (a), an aluminium alkoxide is used.

9. The process according to claim 5, wherein step (b) is performed in two steps: first, at a temperature ≤70° C. and, secondly, at a temperature ranging between 110° C.-120° C. for a period of time of at least 24 hours.

10. The process according to claim 5, wherein step (c) is performed at a mesh aperture ≤63 µm.

11. The process according to claim 5, wherein step (d) is performed by heating, with a slope ranging between 5 and 10° C./min, to a final temperature ranging between 800° C. and 1000° C., which is maintained for a period of time of between 1 and 3 h.

12. The process according to claim 5, wherein, in step (e), a suspension of $\alpha$-$Al_2O_3$ powder, in an alcohol at a concentration ranging between 60%-75% by weight, is mixed with a solution of a zirconium alkoxide diluted in an alcohol at a concentration ranging between 50%-55% by weight.

13. The process according to claim 12, wherein the alcohol is absolute ethanol.

14. The process according to claim 5, wherein the zirconium alkoxide used in step e) is zirconium isopropoxide.

15. The process according to claim 5, wherein step (f) is performed in two steps: first, at a temperature ≤70° C. and, secondly, at a temperature ranging between 110° C.-120° C. for a period of time of at least 24 h.

16. The process according to claim 5, wherein step (g) is performed at a mesh aperture ≤63 µm.

17. The process according to claim 5, wherein step (h) is performed by heating, with a slope ranging between 5 and 10° C./min, to a final temperature ranging between 850° C.-1000° C., which is maintained for a period of time of between 1 and 3 h.

18. The process according to claim 5, wherein, in step (i), the powders obtained in steps (d) and (h) are mixed and suspended in an alcohol, being subjected to grinding for a period of time of at least 72 h.

19. The process according to claim 18, wherein the alcohol is isopropanol.

20. The process according to claim 5, wherein step (f) is performed at a temperature ≤70° C.

21. The process according to claim 5, wherein step (j) is performed at a temperature ≤70° C.

22. The process according to claim 5, wherein step (l) is performed by means of cold isostatic pressing or any other ceramic shaping means selected from the list that comprises casting, pressure casting and tape casting.

23. The process according to claim 5, wherein step (m) is performed at a temperature ranging between 1450° C. and 1500° C.

24. A product selected from the list that comprises knee prostheses, hip prostheses, mechanical components for pumps, dental implants, alkaline batteries, ceramic components for stereotactic neurology and cutting tools, comprising the material according to claim 1.

\* \* \* \* \*